(12) United States Patent  
Waters (10) Patent No.: US 7,295,738 B2
(45) Date of Patent: Nov. 13, 2007

(54) SYSTEM AND METHOD FOR PERFORMING DISPERSION COMPENSATION

(75) Inventor: James P. Waters, Boonton Township, NJ (US)

(73) Assignee: General Dynamics Advanced Information Systems, Inc.

( * ) Notice: Subject to any disclaimer, the term of this patent is extended or adjusted under 35 U.S.C. 154(b) by 102 days.

(21) Appl. No.: 11/008,995

(22) Filed: Dec. 13, 2004

(65) Prior Publication Data

US 2006/0127004 A1    Jun. 15, 2006

(51) Int. Cl.
G02B 6/28 (2006.01)
G02B 6/26 (2006.01)
H04J 14/02 (2006.01)

(52) U.S. Cl. .................. 385/124; 385/123; 385/31; 385/24; 398/81; 398/84; 398/87

(58) Field of Classification Search .............. 385/124
See application file for complete search history.

(56) References Cited

U.S. PATENT DOCUMENTS

| | | | |
|---|---|---|---|
| 3,957,341 A | 5/1976 | Taylor | |
| 4,662,715 A | 5/1987 | Shutterly | |
| 5,016,967 A | 5/1991 | Meltz et al. | |
| 5,323,404 A | 6/1994 | Grubb | |
| 5,459,801 A | 10/1995 | Snitzer | |
| 5,574,807 A | 11/1996 | Snitzer | |
| 5,638,473 A | 6/1997 | Byron | |
| 5,778,119 A | 7/1998 | Farries | |
| 5,946,430 A | 8/1999 | Morrow et al. | |
| 5,953,141 A | 9/1999 | Liu et al. | |
| 5,982,791 A * | 11/1999 | Sorin et al. .................... 372/25 |
| 6,020,986 A | 2/2000 | Ball | |
| 6,072,925 A | 6/2000 | Sakata | |
| 6,101,302 A | 8/2000 | Park et al. | |
| 6,590,684 B1 * | 7/2003 | Goodfellow ................ 398/149 |
| 6,647,180 B2 | 11/2003 | Rothenberg | |
| 6,757,461 B2 | 6/2004 | Matsuoka et al. | |
| 6,792,210 B1 * | 9/2004 | Hallock et al. ............... 398/83 |
| 6,804,057 B1 | 10/2004 | Vakoc | |
| 6,944,372 B2 * | 9/2005 | Boettcher et al. ............. 385/37 |
| 2003/0026529 A1 * | 2/2003 | Durkin et al. ................. 385/24 |
| 2003/0202731 A1 * | 10/2003 | Ionov et al. .................. 385/15 |
| 2004/0037495 A1 * | 2/2004 | Yao ............................. 385/27 |
| 2004/0190828 A1 * | 9/2004 | Boettcher et al. ............. 385/37 |

OTHER PUBLICATIONS

PCT International Search Report mailed Nov. 13, 2006.

* cited by examiner

*Primary Examiner*—Frank G. Font
*Assistant Examiner*—Mary El-Shammaa
(74) *Attorney, Agent, or Firm*—Steptoe & Johnson (57) ABSTRACT

An exemplary embodiment of the present invention includes an optical circulator. The circulator may have, for example, a first port, a second port, and a third port. The first port may be configured to introduce light into the optical circulator. The system may also include a tunable fiber filter Bragg grating connected to the second port of the circulator and a tunable dispersion-compensating fiber Bragg grating connected to the third port of the optical circulator. The tunable dispersion compensating fiber Bragg grating and the tunable fiber filter Bragg grating may be configured to be tuned by a single actuator. This tuning may be either compression or strain tuning.

25 Claims, 8 Drawing Sheets

SYSTEM AND METHOD FOR PERFORMING DISPERSION COMPENSATION

FIELD OF THE INVENTION

The invention relates to devices for use in optical fiber systems. Particularly, the invention relates to systems and methods for simultaneous wavelength selection and performing dispersion compensation in optical fiber systems.

BACKGROUND OF THE INVENTION

Fiber optic communication systems are generally known. There are various types of fiber optic communication systems, including local area networks (LANs), wide area networks (WAN), and various other long-haul fiber optic communication systems. Various deleterious effects occur in fiber optic communication systems, such as, for example, the introduction of noise, optical loss, scattering effects, and wavelength dispersion. One of the last steps in the installation of a long-haul communication system is to configure the terminal receiver to receive the light transmitted over the link. Dispersion, however, complicates the set up of such a receiver. In a system employing a single channel, or a channel located at one wavelength, dispersion may be easily addressed during the deployment of the fiber and the repeaters and amplifiers in the system.

Most fiber optic systems, however, are configured to transmit tens or even hundreds of signals using wavelength division multiplexing (WDM). For example, systems have been designed that can carry 40 channels or 80 or more channels over the range from about 1450 nm to about 1650 nm or more using various amplifiers. Other wavelengths have also been employed such as those in the 1300 nm to 1400 nm range. These infrared wavelengths are used because these are the wavelengths at which traditional optical fibers (typically made using silica glass or various blends of silica glass) will transmit at a relatively low loss. Additionally, amplifiers such as erbium-doped fiber amplifiers and Raman amplifiers have been designed to amplify signals or channels at these wavelengths, thereby permitting long-haul communication of information with a low loss.

Because dispersion is a wavelength-dependent effect, compensation of dispersion in these systems is complex because some channels may require more compensation than others. Due to the dispersion slope of the fiber (i.e., the amount of dispersion as a function of wavelength), only one channel may be appropriately dispersion compensated in the deployment of the system. Therefore, the remainder of the channels may require dispersion compensation at the terminal receivers or optical amplifiers throughout the system. Because dispersion in a typical long-haul system may be as high as ±6000 ps/nm, failure to correct for dispersion may result in total loss of information on the signal.

The aforementioned dispersion compensation problem may be amplified by the increasingly complicated undersea systems. Such systems may include, for example, 16 fibers, each of which may have 32 of more WDM channels. Thus, at a terminal site as many as 512 or more channels may be received by the receiver, each of which may require dispersion compensation by various devices within the receiver. The conventional methods for compensating for dispersion are expensive and time-consuming and will be essentially obsolete with the increasing complexity of modern DWDM systems. It requires a considerable amount of labor to compensate each of the signals to provide a bit-error-rate (BER) in excess of $10^{-12}$.

One traditional method for compensating dispersion in an optical communication system includes splicing in long lengths of fiber that have a dispersion slope that is complementary (or otherwise opposite) to the dispersion slope of the original fiber. In order to conserve time, money, and man-power, in some systems, up to four channels may be compensated using a single span of fiber, thereby producing an acceptable, although imperfect compensation of the dispersion. This imperfect dispersion compensation is designed within the system signal-to-noise ratio (SNR) tolerances.

This method of dispersion compensation has a number of disadvantages. One such disadvantage is the introduction of loss to the signal such that additional optical amplifiers may need to be employed in order to compensate for the optical loss. This adds cost and complexity to the system, as amplifiers themselves are the source of system noise and may also account for additional deleterious effects in the system. Secondly, only the approximate accumulated dispersion is known beforehand, and thus a time-consuming trial and error approach may be required to determine the appropriate amount of dispersion compensation on a per-wavelength basis. This may lead to schedule delays and large financial penalties. Therefore, a quick, low-loss method may result in substantial financial savings.

The present invention may address the problems associated with dispersion in a timely manner and may be configured to simultaneously provide an agile wavelength selection filter. Further, the design can be tuned. In one exemplary embodiment of the present invention, the device may be tuned over, for example 10 nm or more. Thus, the entire C band (e.g., 1530 nm to about 1560 nm) can be covered with as little as 3 slightly different filter designs. For any given wavelength within the C band, an off the shelf dynamic receiver could be used in combination with the invention to demultiplex (DEMUX), dispersion compensate, and electronically convert the signal all within a matter of minutes. This technique may be lower loss and therefore, system gain requirements may be reduced.

SUMMARY OF THE INVENTION

Thus, the invention is directed to an improved system and method for simultaneously selecting a wavelength and compensating for dispersion in an optical fiber-based systems. By having the ability to tune the dispersion compensator to a particular wavelength or channel, one design may be configured to cover a number of wavelengths that can be either on or off the International Telecommunications Union (ITU) grid.

An exemplary embodiment of the present invention includes an optical circulator. The circulator may have, for example, a first port, a second port, and a third port. The first port may be configured to introduce light into the optical circulator. The system may also include a tunable fiber filter Bragg grating connected to the second port of the circulator and a tunable dispersion-compensating fiber Bragg grating connected to the third port of the optical circulator. The tunable dispersion compensating fiber Bragg grating and the tunable fiber filter Bragg grating may be configured to be tuned by a single actuator through tension.

According to another exemplary embodiment of the present invention, a system may include a fiber filter Bragg grating and a dispersion-compensating fiber Bragg grating. The system may also include a sleeve. The sleeve may be configured to house the fiber filter Bragg grating and the dispersion-compensating fiber Bragg grating. A first ferrule and a second ferrule may be disposed at least partially within the sleeve. An actuator may be configured to tune both the fiber filter Bragg grating and the dispersion-compensating fiber Bragg grating through compression.

BRIEF DESCRIPTION OF THE DRAWINGS

While the specification concludes with claims particularly pointing out and distinctly claiming the present invention, it is believed the same will be better understood from the following description taken in conjunction with the accompanying drawings, which illustrate, in a non-limiting fashion, the best mode presently contemplated for carrying out the present invention, and in which like reference numerals designate like parts throughout the Figures, wherein:

DETAILED DESCRIPTION OF THE INVENTION

The present disclosure will now be described more fully with reference the to the Figures in which various embodiments of the present invention are shown. The subject matter of this disclosure may, however, be embodied in many different forms and should not be construed as being limited to the embodiments set forth herein.

Figure 1:
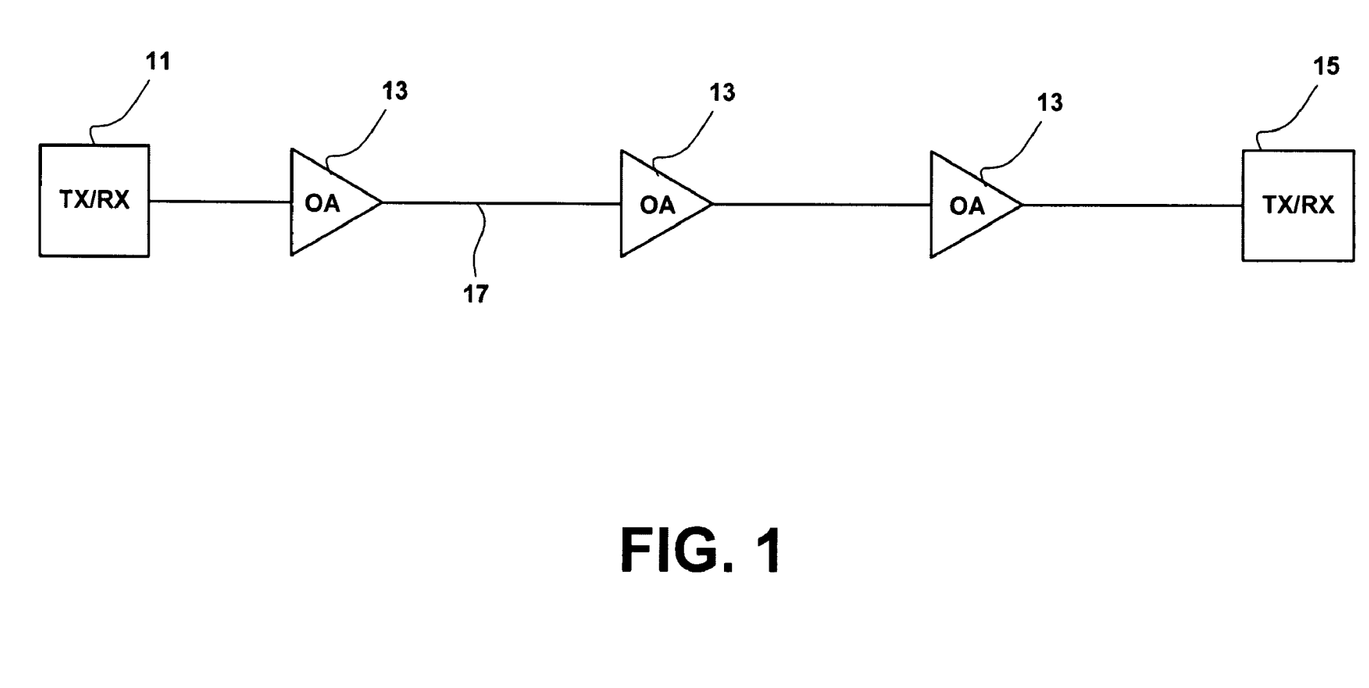
FIG. 1 shows an optical-fiber based system employing an embodiment of the invention.

FIG. 1 shows an optical-fiber based system employing an embodiment of the invention. The optical fiber-based system may be configured to transmit data over the optical fiber link 17. The system may include a first optical transceiver 11, which is configured to both receive and transmit optical signals over the data link. The system may also include a second optical transceiver 15. The system depicted in FIG. 1, may be a bidirectional optical communication system. While a bidirectional system is shown in FIG. 1, one of ordinary skill in the art will understand that an optical system may be unidirectional, and may include a receiver at one end and a transmitter at the other. The system may also include a number of optical amplifiers 13, which are configured to amplify the optical signals as they pass through the link 17. While three amplifiers 13 are shown in FIG. 1, any number of amplifiers may be used as determined by the link/loss budget and the acceptable noise tolerances.

Figure 2:
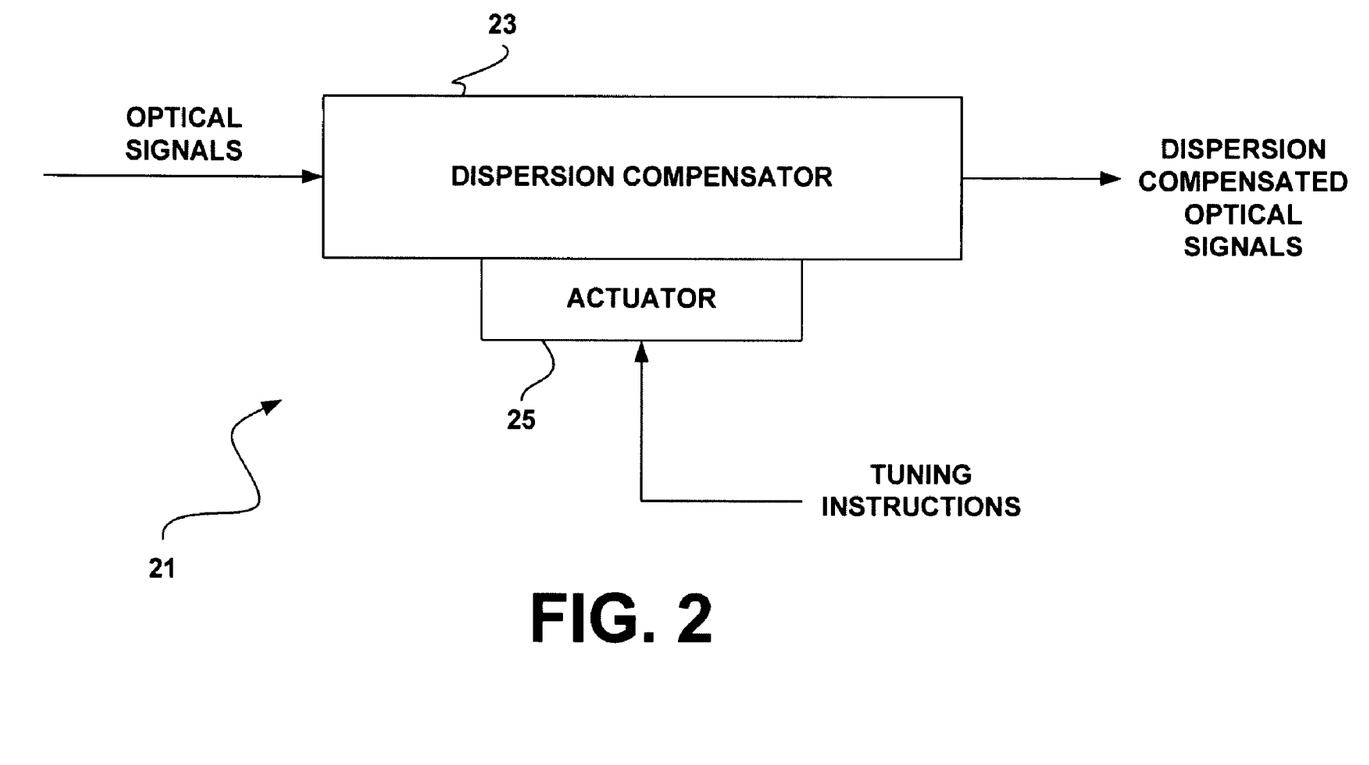
FIG. 2 shows a functional block diagram of a system according to the present invention.

FIG. 2 shows a functional block diagram of a system according to the present invention. The dispersion compensation system 21 may include a dispersion compensator 23. The dispersion compensator 23 may be configured to receive optical signals from the link and may be configured to perform a dispersion compensation function on those signals to produce dispersion compensated optical signals at the output of the dispersion compensator. The dispersion compensator 23 may be a tunable dispersion compensator and may be configured to be tuned using an actuator 25. Numerous actuators may be used in connection with the dispersion compensator, including, for example, piezoelectric transducers (PZTs) and hydraulic or pneumatic actuators, to name a few. The present invention is not to be limited to a particular type of actuator—the actuator merely should be adapted to apply tension or compression to an optical fiber. The actuator may be generic and could be any mechanical device that can produce a linear or translated motion. These include DC motors, stepper motors, solenoids, piezoelectric actuators and magnetostrictive actuators. The actuator may perform tuning based on tuning instructions performed to maximize the opening of the received "eye" diagram (minimum wavelength dispersion).

Figure 3:
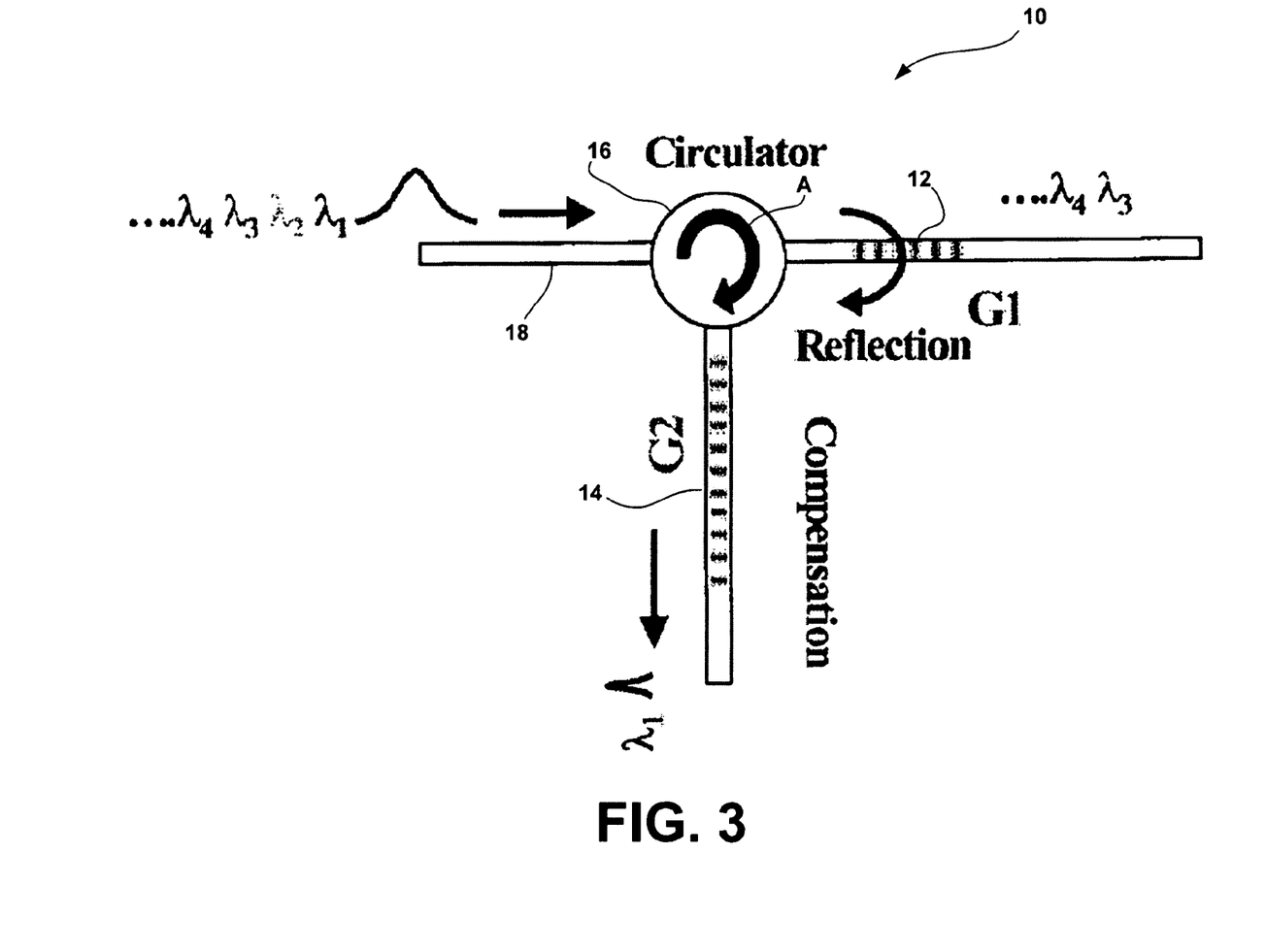
FIG. 3 shows a schematic of a dynamic terminal receiver in accordance with an exemplary embodiment of the present invention.
Figure 4:
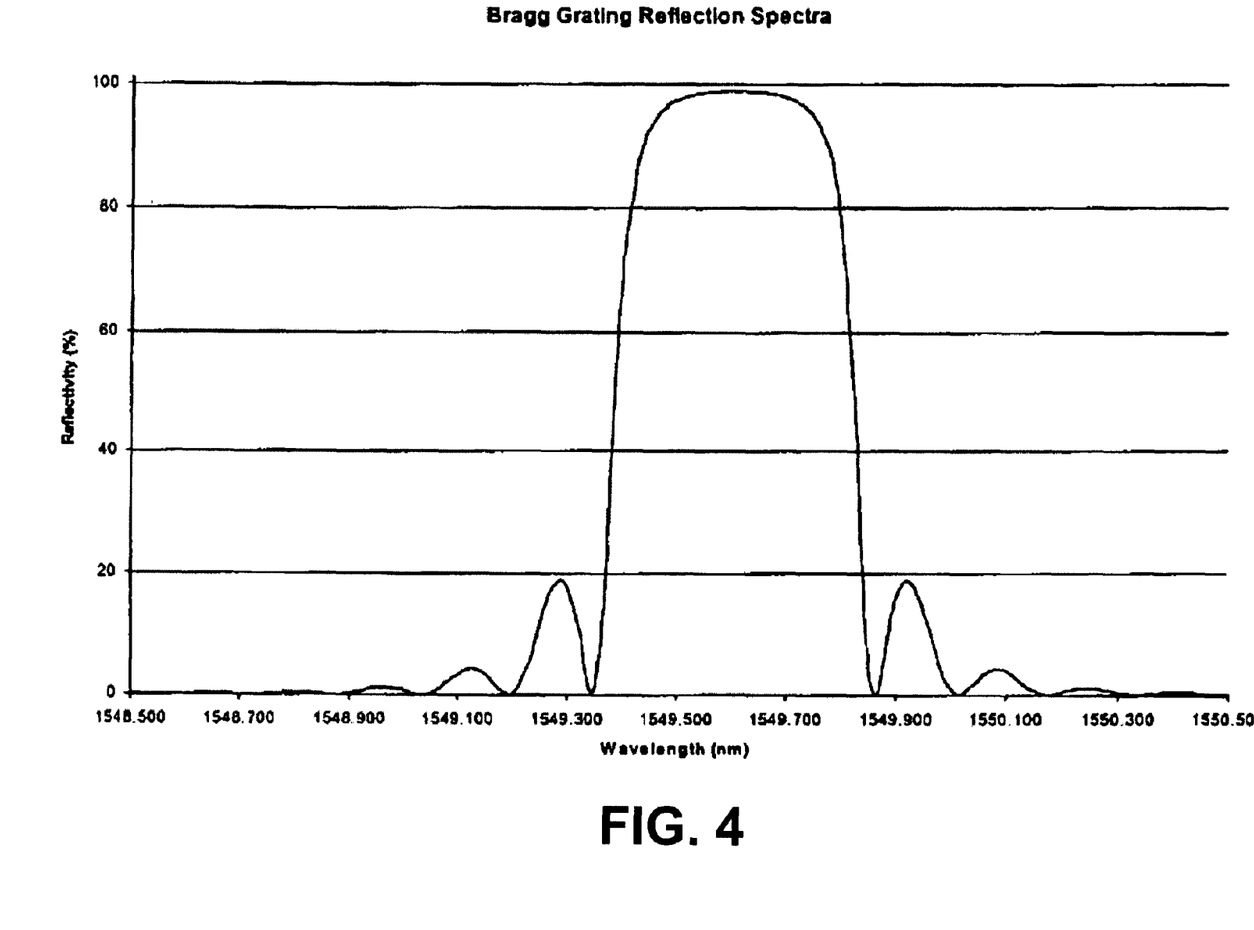
FIG. 4 shows a graph of a typical reflective spectrum for a Bragg grating that may be used in connection with an embodiment of the invention.

FIG. 3 shows a schematic of a dynamic terminal receiver in accordance with an exemplary embodiment of the present invention. The present invention may be implemented at, for example the receiver portion of a fiber-based communication system. Alternatively, the dispersion compensators may be deployed at any point where dispersion compensation may be needed, including, for example, at optical amplifiers or repeaters. The dispersion compensator 10 may include a fiber filter Bragg grating 12 and a dispersion-compensating Bragg grating 14. Additionally the dispersion compensator may also include an optical circulator 16. Any type of circulator 16 may be used in connection with the present invention. A WDM signal ($\lambda_1, \lambda_2, \lambda_3, \lambda_4, \ldots$) may enter the dispersion compensation device 10 from an input fiber 18, which may be coupled to a first port of an optical circulator 16. The input fiber 18 may be configured to direct the signals into the optical circulator 16. The optical circulator may be configured to relay the incoming optical signals to the fiber filter Bragg grating 12. The fiber filter Bragg grating 12 may be configured to allow certain channels (e.g., $\lambda_2, \lambda_3, \lambda_4, \ldots$) to pass through the fiber filter Bragg grating 12 while reflecting light of $\lambda_1$. The reflected light from the fiber filter Bragg grating 12 may be routed back into the second port of the circulator 16 and may be directed to be incident on the dispersion-compensating Bragg grating 14. The arrow A on the optical circulator 16 indicates the direction that the optical circulator directs light through the system. The fiber filter Bragg grating 12 may be configured to reflect nearly 100% of the light at the selected wavelength, $\lambda_1$. All other wavelengths may be transmitted. A typical reflectivity spectrum for an exemplary Bragg grating is shown in FIG. 4. This exemplary grating design is designed such that it reflects nearly all of $\lambda_1$, and a second similar grating Bragg grating but with the band pass edge at $\lambda_1$ used to compensate for dispersion via transmission as disclosed in U.S. Pat. No. 6,356,684, which is hereby incorporated by reference in its entirety.

The fiber filter Bragg grating 12 and the dispersion-compensation Bragg grating 14 may be either compressed or strained to tune the dispersion compensator 10. Alternatively, the fiber filter Bragg grating 12 and the dispersion-compensating fiber Bragg grating 14 may be configured to be selectively compressed or strained to tune the dispersion compensator 10. Conceptually, the fiber filter Bragg grating 12 may be tuned to substantially the center of the wavelength of interest and the band edge of the dispersion-compensation Bragg grating 14 is tuned simultaneously to the wavelength of interest to provide dispersion compensation.

According to one embodiment of the invention, the fiber filter Bragg grating 12 and the dispersion-compensating fiber Bragg grating 14 may be configured to be tuned by the same actuator. Accordingly, the lengths of the fibers associated with the fiber filter Bragg grating 12 and the dispersion-compensation fiber Bragg grating 14 should be substantially the same because the change in grating spacing is proportional to the change in length of the fiber over the entire length of the fiber ($\Delta L/L$).

Figure 5:
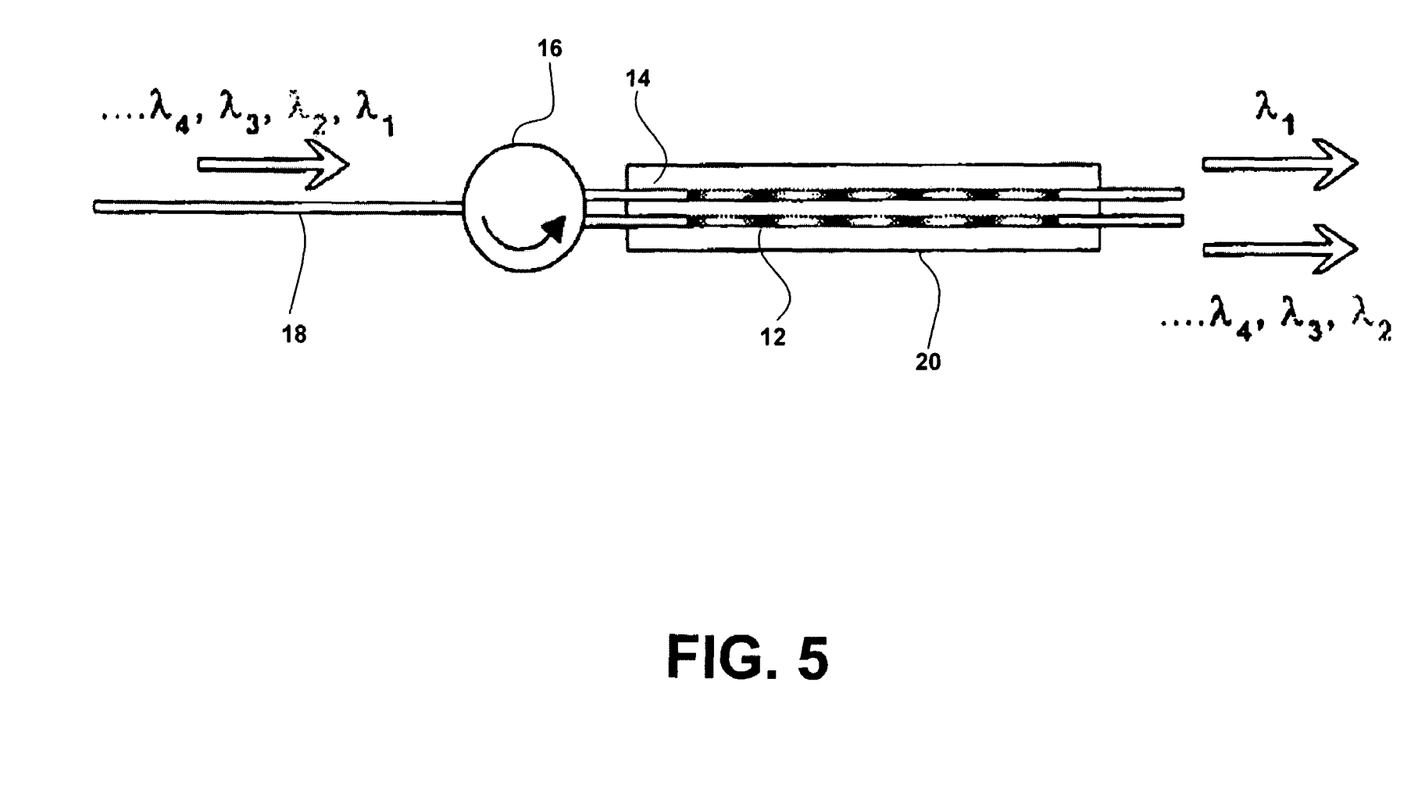
FIG. 5 shows an exemplary configuration of a compression tunable terminal receiver in accordance with the present invention.

FIG. 5 shows an exemplary configuration of a compression tunable terminal receiver in accordance with the present invention. As shown in FIG. 5, the dispersion compensator may include a fiber filter Bragg grating 12 and a dispersion-compensating fiber Bragg grating 14, which may be coupled to a second and third port of the optical circulator 16, for example. The light associated with information-bearing channels is transmitted to the optical circulator 16 via an input fiber 18. The dispersion compensator shown in FIG. 5 may include a compression/strain unit 20.

Figure 6:
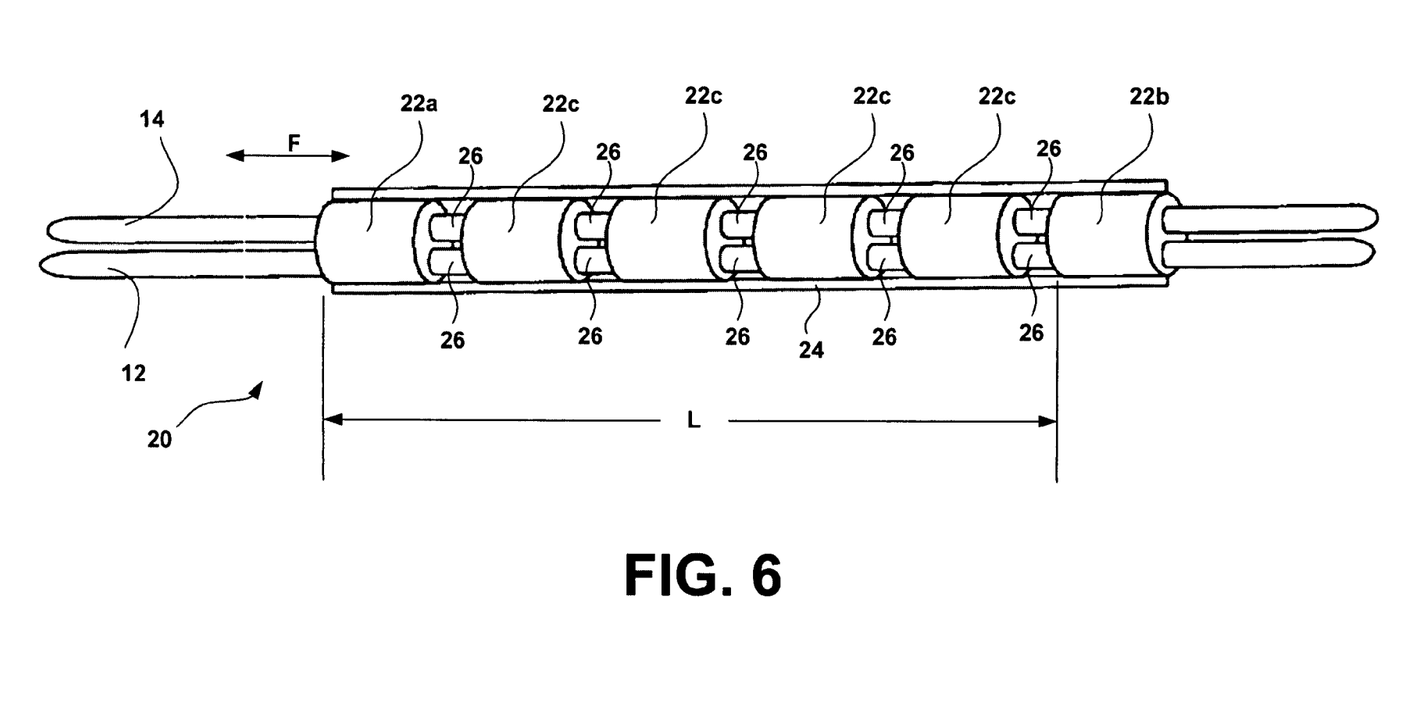
FIG. 6 shows an embodiment of a tunable dispersion compensator according to the present invention.

FIG. 6 shows an embodiment of a tunable dispersion compensator according to the present invention. More particularly, FIG. 6 shows an embodiment of the compression/strain unit 20 as shown in FIG. 5. The compression/strain unit 20 may include a series of fiber ferrules 22 and sleeve 24. The sleeve 24 may be configured to at least partially house the fiber ferrules 22. These fiber ferrules 22 may be, for example, bare fiber ferrules 22, which are commercially available and may be configured to have multiple bores that permit precision alignment of multiple fibers. Each fiber ferrule 22 may include at least two bores, which may be configured to extend axially though the fiber ferrules 22 permitting alignment of the fiber filter Bragg grating 12 and the dispersion-compensating Bragg grating 14. The ferrules 22 may include a first ferrule 22a, and a second ferrule 22b. The ferrules may also include at least one floating ferrule 22c, located between the first ferrule 22a and the second ferrule 22b. The first ferrule 22a may be attached to the fiber including the fiber filter Bragg grating 12, and the dispersion-compensating fiber Bragg grating 14. The first ferrule 22a may be coupled to the fibers using, for example, adhesives or other means for connecting ferrules, such as heat treatments or chemical binding of the first ferrule 22a to the fibers. The first ferrule 22a may be otherwise free to move within the sleeve 24.

The second ferrule 22b may be attached to the fiber filter Bragg grating 12 and the dispersion-compensating fiber Bragg grating 14. Additionally, according to one exemplary embodiment, the second ferrule 22b may be attached to the sleeve 24 such that the second ferrule 22b cannot freely move within the sleeve. The floating ferrules 22c are need not be attached to either the fiber filter Bragg grating 12 or the dispersion-compensating fiber Bragg grating 14 and may be free to move within the sleeve 24. The spacing between the floating ferrules 22c may be configured to be maintained by a compliant material such as rubber "O" rings. The distance between the various ferrules 22a, 22b and 22c may be chosen such as to prevent the fibers from buckling under compressive forces. The fiber filter Bragg grating 12 and the dispersion-compensating fiber Bragg grating 14 may be simultaneously compressed by applying a force at the first ferrule 22a along a substantially axial direction, as indicated by the vector "F" in FIG. 6. The lengths of compression for the fiber filter Bragg grating 12 and the dispersion-compensation fiber Bragg grating 14 may be defined as the distance between the first ferrule 22a and the second ferrule 22b. The distance may be substantially identical for the fiber filter Bragg grating 12 and the dispersion compensating fiber Bragg grating 14. The change in length ($\Delta L$) when the fibers are in compression is limited by the distance between ferrules 22a, 22c, and 22b.

In practice, the fiber filter Bragg grating 12 and the dispersion compensating fiber Bragg grating 14 may be compressed until the spacing in the fiber filter Bragg grating 12 is at the Bragg condition for the wavelength of interest. At this point, the wavelength of interest is totally reflected and routed by the optical circulator 16 to the dispersion-compensating fiber Bragg grating 14. the compressive force may be fine tuned until the dispersion reaches a minimum. Since the fiber filter Bragg grating 12 has a profile with a relatively flat top, slight movement of the fiber filter Bragg grating's spacing during dispersion compensation will have little effect on its reflectivity. Optimal compensation my be found through the technique described in U.S. Pat. No. 6,304,696, which is hereby incorporated by reference in its entirety.

Figure 7:
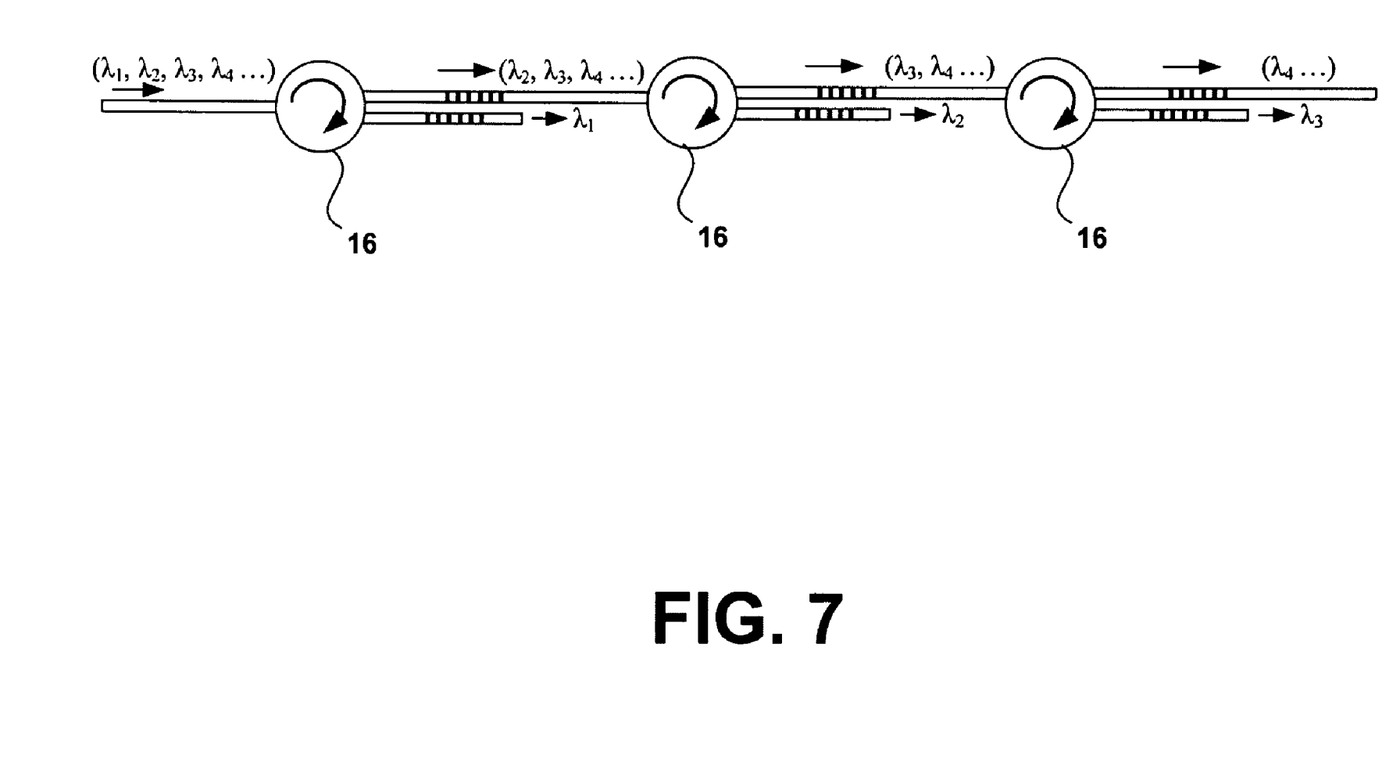
FIG. 7 shows an exemplary embodiment of a dispersion compensator used as a demultiplexer according to an embodiment of the present invention.

By performing the filter function and dispersion compensation in this manner, several advantages may be realized. The process may be configured to have a relatively low loss. Additionally, the optical circulator loss may be less than 1.0 dB, and the optical loss associated with the dispersion compensating grating may be less than 2 dB. Therefore, the use of an additional optical amplifier, such as, for example, an optical preamplifier is not necessary. This low loss may also allow the unit to be used as a demultiplexer. Only one of the channels is reflected by the fiber filter Bragg grating 12. All of the rest of the channels may be transmitted. Thus, several units may be chained together to provide the demultiplexing function, as shown in FIG. 7. FIG. 7 shows a number of circulators 16 chained together and configured to demultiplex the WDM input signals.

Figure 8:
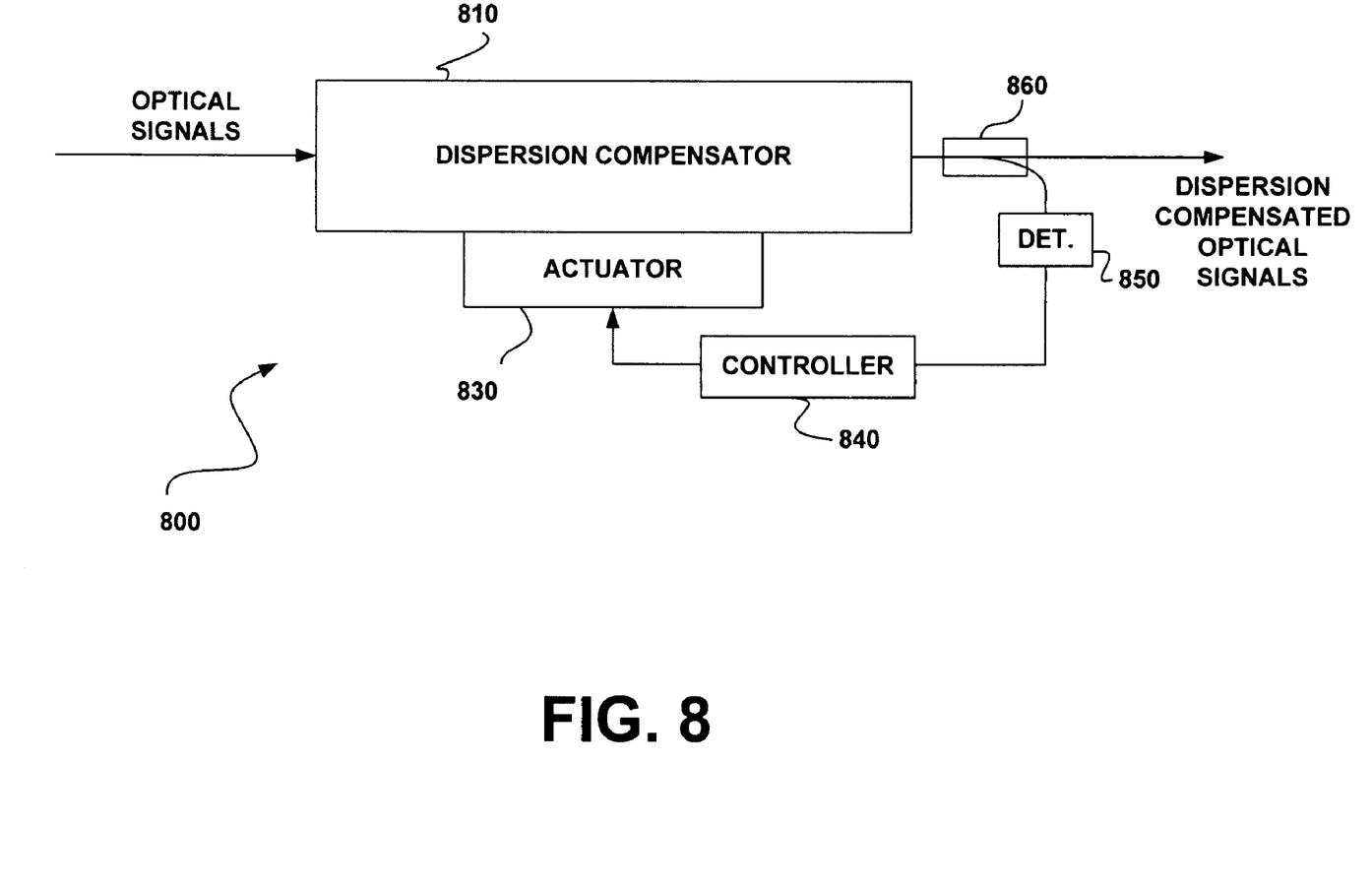
FIG. 8 shows an exemplary embodiment of a dispersion compensator having a control system according to one implementation of the invention.

FIG. 8 shows a dispersion compensating system having a feedback tuning system according to one embodiment of the present invention. The dispersion compensating system 800 may be configured to receive optical signals via an optical fiber. The dispersion compensator 810 may perform dispersion compensation of the optical signals passing through the dispersion compensator 810. For example, the dispersion compensator 810 may compensate for the dispersion associated with a particular channel. After the channels have passed through the dispersion compensator 810, the signals may pass through an optical tap or splitter 860. The splitter 860 may be configured to remove a small portion of the light from the optical signals output from the dispersion compensator 810. For example, the splitter 860 may be configured to remove 10%, 5%, or even 1% or some other amount of the optical signal and may feed the removed optical signal to a detector 850. The detector 850 may be, for example, a optical spectrum analyzer, an oscilloscope, or a photodetector. The type of detector 850 only need be able to convert an optical signal into an electrical signal for processing by the controller 840. The controller 840 may be configured to determine if the dispersion compensator needs to be tuned. This may be done by analyzing the quality of the eye diagram that is produced by the output signals. The controller 840 may be configured to continuously tune the dispersion compensator to ensure that the dispersion compensator is obtaining the optimal amount of dispersion compensation. Alternatively, the controller 840 may be configured to perform periodic tests to ensure that the dispersion compensator is properly tuned. The controller 840 may be configured to output control signals to the actuator 830, which may be configured to tune the dispersion compensating fiber Bragg grating and the fiber Bragg grating simultaneously, as described in detail above. Other control systems, such as those described in U.S. Pat. No. 6,356,684 may be employed in connection with the dispersion compensator of the present invention.

Alternatively, the dispersion compensator 810 may be tuned manually (not shown) and then deployed in the field. The manual tuning may be performed by optimizing the eye pattern graph to obtain the sharpest image of the eye. Then the dispersion compensator of the present invention may be manually tuned at a receiver, for example, when maintenance is required.

Numerous other configurations of a dispersion compensator may be implemented based on the present disclosure. While the invention has been described with reference to specific preferred embodiments, it is not limited to these embodiments. For example, while certain embodiments of the invention were described with respect to using a single sleeve, other embodiments may be implemented using multiple sleeves or ferrules and tuning the gratings with the same actuator. Additionally, the use of ferrules was disclosed as a means for preventing the optical fibers from buckling, it should be understood that various other structural supports may be used to maintain the structural integrity of the optical fibers when they are compressed or strained. Additionally, the dispersion compensation need not be performed within a terminal receiver in a communications system and may be used at any stage in an optical system where dispersion compensation may be required or otherwise desirable. The invention may be modified or varied in many ways and such modifications and variations as would be obvious to one of skill in the art are within the scope and spirit of the invention and are included within the scope of the following claims.

I claim:

1. An apparatus, comprising:
   an optical circulator having a first port, a second port, and a third port, the first port being configured to transmit light into the optical circulator;
   a tunable fiber filter Bragg grating operatively connected to the second port of the optical circulator; and
   a tunable dispersion-compensating fiber Bragg grating connected to the third port of the optical circulator, wherein the tunable fiber filter Bragg grating and the tunable dispersion compensating Bragg grating are configured to be tuned by a common actuator.

2. The apparatus of claim 1, wherein the optical circulator is configured to direct light received at the first port to the second port, receive light reflected by the fiber filter Bragg grating at the second port, and direct the light reflected by the fiber filter Bragg grating to a third port.

3. The apparatus of claim 1, wherein the tunable fiber filter Bragg grating is configured to be tuned to a predetermined channel.

4. The apparatus of claim 1, wherein a band edge of the dispersion-compensating fiber Bragg grating is configured to be tuned to a predetermined channel.

5. The apparatus of claim 1, further comprising:
   an actuator, the actuator being configured to tune both the fiber filter Bragg grating and the dispersion-compensating fiber Bragg grating by selectively employing one of tension or compression to the fiber filter Bragg grating and the dispersion-compensating fiber Bragg grating.

6. The apparatus of claim 1, further comprising:
   an actuator, the actuator being configured to tune both the fiber filter Bragg grating and the dispersion-compensating fiber Bragg grating by compressing the fiber filter Bragg grating and the dispersion-compensating fiber Bragg grating.

7. The apparatus of claim 6, wherein said fiber filter Bragg grating includes a fiber of having a length and the dispersion-compensating fiber Bragg grating includes a fiber having substantially the same length as the length of the fiber associated with the fiber filter Bragg grating.

8. The apparatus of claim 1, further comprising:
   a sleeve;
   a first ferrule; and
   a second ferrule, the first ferrule being configured to move within the sleeve and the second ferrule being coupled to the sleeve, the first ferrule and the second ferrule being configured to be coupled to the fiber filter Bragg grating and the dispersion compensating fiber Bragg grating, whereby the first ferrule is configured to be selectively moved within the sleeve to tune the fiber filter Bragg grating and the dispersion compensating Bragg grating.

9. The apparatus of claim 8, wherein the first ferrule is coupled to the fiber filter Bragg grating using an adhesive material.

10. The apparatus of claim 8, further comprising:
    a floating ferrule disposed within the sleeve, the floating ferrule being configured to provide structural support for the fiber filter Bragg grating and the dispersion compensating fiber Bragg grating.

11. A system for dispersion-compensation, comprising:
    a fiber filter Bragg grating;
    a dispersion-compensating fiber Bragg grating:
    a sleeve, the sleeve being configured to house the fiber filter Bragg grating and the dispersion-compensating fiber Bragg grating;
    a first ferrule and a second ferrule, the first ferrule and the second ferrule being disposed at least partially within the sleeve; and
    an actuator, the actuator being configured to tune both the fiber filter Bragg grating and the dispersion-compensating fiber Bragg grating.

12. The system for dispersion-compensation of claim 11, wherein the actuator is configured to tune both the fiber filter Bragg grating and the dispersion-compensating fiber Bragg grating by compressing fibers associated with the fiber filter Bragg grating and the dispersion compensating fiber Bragg grating.

13. The system for dispersion-compensation of claim 11, wherein the actuator is configured to tune both the fiber filter Bragg grating and the dispersion-compensating fiber Bragg grating by applying tension to the fibers associated with the fiber filter Bragg grating and the dispersion compensating fiber Bragg grating.

14. The system for dispersion compensation of claim 11, wherein the first ferrule is coupled to the fiber filter Bragg grating and the dispersion compensating fiber Bragg grating, the first ferrule being configured to move within the sleeve.

15. The system for dispersion compensation of claim 11, further comprising:
    a floating ferrule, the floating ferrule being disposed within the sleeve and being configured to provide structural support for the fiber filter Bragg grating and the dispersion compensating fiber Bragg grating.

16. A method, comprising:
    determining a channel needing dispersion compensation;
    providing a fiber filter Bragg grating and a dispersion-compensating fiber Bragg grating coupled to different ports of an optical circulator; and
    simultaneously tuning the fiber filter Bragg grating and the dispersion-compensating fiber Bragg grating using a common actuator.

17. The method of claim 16, wherein the step of simultaneously tuning the fiber filter Bragg grating and the dispersion compensating fiber Bragg grating includes tuning a band edge of the dispersion compensating fiber Bragg grating to the channel needing dispersion compensation.

18. The method of claim 16, wherein the step of simultaneously tuning includes at least one of compression tuning and strain tuning.

19. The method of claim 18, wherein the step of simultaneously tuning includes at least one of applying compression or strain on the fiber filter Bragg grating and the dispersion compensating fiber Bragg grating by applying a force to a ferrule coupled to the fiber filter Bragg grating and the dispersion compensating fiber Bragg grating.

20. The method of claim 16, wherein simultaneously tuning is accomplished by providing feedback control to the common actuator.

21. An apparatus, comprising:
an optical circulator having a first port, a second port, and a third port, the first port being configured to transmit light into the optical circulator;
a tunable fiber filter Bragg grating operatively connected to the second port of the optical circulator;
a tunable dispersion-compensating fiber Bragg grating connected to the third port of the optical circulator, wherein the tunable fiber filter Bragg grating and the tunable dispersion compensating Bragg grating are configured to be tuned by a common actuator;
a sleeve;
a first ferrule; and
a second ferrule, the first ferrule being configured to move within the sleeve and the second ferrule being coupled to the sleeve, the first ferrule and the second ferrule being configured to be coupled to the fiber filter Bragg grating and the dispersion compensating fiber Bragg grating, whereby the first ferrule is configured to be selectively moved within the sleeve to tune the fiber filter Bragg grating and the dispersion compensating Bragg grating.

22. The apparatus of claim 21, wherein the first ferrule is coupled to the fiber filter Bragg grating using an adhesive material.

23. The apparatus of claim 21, further comprising:
a floating ferrule disposed within the sleeve, the floating ferrule being configured to provide structural support for the fiber filter Bragg grating and the dispersion compensating fiber Bragg grating.

24. A system for dispersion-compensation, comprising:
a fiber filter Bragg grating;
a dispersion-compensating fiber Bragg grating:
a sleeve, the sleeve being configured to house the fiber filter Bragg grating and the dispersion-compensating fiber Bragg grating;
a first ferrule and a second ferrule, the first ferrule and the second ferrule being disposed at least partially within the sleeve; and
an actuator, the actuator being configured to tune both the fiber filter Bragg grating and the dispersion-compensating fiber Bragg grating;
wherein the first ferrule is coupled to the fiber filter Bragg grating and the dispersion compensating fiber Bragg grating, the first ferrule being configured to move within the sleeve.

25. A system for dispersion-compensation, comprising:
a fiber filter Bragg grating;
a dispersion-compensating fiber Bragg grating:
a sleeve, the sleeve being configured to house the fiber filter Bragg grating and the dispersion-compensating fiber Bragg grating;
a first ferrule and a second ferrule, the first ferrule and the second ferrule being disposed at least partially within the sleeve;
an actuator, the actuator being configured to tune both the fiber filter Bragg grating and the dispersion-compensating fiber Bragg grating; and
a floating ferrule, the floating ferrule being disposed within the sleeve and being configured to provide structural support for the fiber filter Bragg grating and the dispersion compensating fiber Bragg grating.

* * * * *